(12) United States Patent
Seikai et al.

(10) Patent No.: US 7,606,647 B2
(45) Date of Patent: Oct. 20, 2009

(54) COMMUNICATION CONTROL DEVICE FOR PASSENGER PROTECTION DEVICE

(75) Inventors: Hiroshi Seikai, Utsunomiya (JP); Syoji Narita, Utsunomiya (JP); Hideaki Ozawa, Utsunomiya (JP); Masaaki Takahashi, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 612 days.

(21) Appl. No.: 11/222,481

(22) Filed: Sep. 8, 2005

(65) Prior Publication Data

US 2006/0058959 A1    Mar. 16, 2006

(30) Foreign Application Priority Data

Sep. 14, 2004   (JP) ............................. P2004-266644

(51) Int. Cl.
   *B60R 21/0136* (2006.01)
(52) U.S. Cl. .................. 701/45; 701/216; 180/271; 180/274; 280/735; 340/436
(58) Field of Classification Search .............. 701/216, 701/45, 36; 180/271, 274; 280/735; 340/436
   See application file for complete search history.

(56) References Cited

U.S. PATENT DOCUMENTS

| | | | | |
|---|---|---|---|---|
| 4,381,829 A * | 5/1983 | Montaron | .................... | 180/274 |
| 5,357,141 A | 10/1994 | Nitschke et al. | | |
| 5,363,303 A | 11/1994 | Kaneko et al. | | |
| 5,904,368 A * | 5/1999 | Blackburn et al. | .......... | 280/735 |
| 6,275,148 B1 * | 8/2001 | Takamura et al. | ........... | 340/442 |
| 6,426,567 B2 * | 7/2002 | Ugusa et al. | ................ | 307/10.1 |
| 6,470,249 B1 * | 10/2002 | Schmid et al. | ................ | 701/45 |
| 6,604,416 B2 * | 8/2003 | Tsujita | ....................... | 73/146.5 |
| 6,615,122 B1 * | 9/2003 | Yamashita | .................... | 701/45 |
| 7,120,525 B2 * | 10/2006 | Seikai | ........................ | 701/45 |
| 7,131,512 B2 * | 11/2006 | Aoki | .......................... | 180/271 |
| 7,168,737 B2 * | 1/2007 | Okamoto et al. | ............ | 280/735 |
| 7,394,357 B2 * | 7/2008 | Kurata | ........................ | 340/447 |
| 2003/0132622 A1 | 7/2003 | Miyata et al. | | |
| 2005/0178600 A1 * | 8/2005 | Kincaid | ....................... | 180/268 |
| 2005/0235744 A1 * | 10/2005 | Ogawa | ........................ | 73/146 |

FOREIGN PATENT DOCUMENTS

| | | |
|---|---|---|
| DE | 197 57 118 | 7/1999 |
| JP | 09-269247 | 10/1997 |
| JP | 11-059323 | 3/1999 |
| JP | 3206469 | 7/2001 |
| WO | 2004/052697 | 6/2004 |

\* cited by examiner

*Primary Examiner*—Khoi Tran
*Assistant Examiner*—Nikhil Sriraman
(74) *Attorney, Agent, or Firm*—Fish & Richardson P.C.

(57) ABSTRACT

A communication control device for passenger protection device includes a satellite sensor unit and an ECU being connected to the satellite sensor unit via a communication line. The satellite sensor unit includes a satellite sensor main body, which detects an impact against a vehicle, and a controller, which obtains a measurement from a signal detected by the satellite sensor main body. The ECU includes a main controller which determines deployment of a passenger protection device. The controller of the satellite sensor unit is adapted to compares the measurement or a calculated value which is calculated based on the measurement with a preset reference value range, and, when the measurement or the calculated value is within the reference value range, the controller transmits a communication from the satellite sensor unit to the ECU at an interval which is longer than a predetermined time interval.

5 Claims, 7 Drawing Sheets

COMMUNICATION CONTROL DEVICE FOR PASSENGER PROTECTION DEVICE

BACKGROUND

1. Field of the Invention

The present invention relates to a communication control device for passenger protection device, which is used as a supplemental restraint system (SRS) for protecting passengers when a vehicle collides.

Priority is claimed on Japanese Patent Application No. 2004-266644, filed Sep. 14, 2004, the contents of which are incorporated herein by reference.

2. Description of the Related Art

Conventionally, for example, a communication control device for passenger protection device includes, in a center unit, for example, a main controller provided near a center console, a floor sensor provided in a center of the vehicle, and a plurality of satellite sensors provided at the front and sides of the vehicle. The main controller determines a collision state of the vehicle based on signals which are output from the floor sensor and the satellite sensors, and controls the activation of airbags.

The floor sensor is generally installed near the main controller and connected directly to it, or contained inside the main controller. In contrast, the satellite sensors are installed on a front band and near B pillars of the left and right doors. Output signals from these satellite sensors are transmitted via communication cables to the main controller. For example, the satellite sensors digitize detection signals and send them constantly to the main controller. Each satellite sensor has a predetermined threshold which is set beforehand. When the detected level of deceleration exceeds this threshold, the satellite sensor transmits an output signal indicating a threshold excess to the main controller. In view of the need to reduce the number of cables installed in the vehicle and so on, a serial communication system is used as the communication system between the satellite sensors and the main controller.

In this type of communication control device for passenger protection device, since digital signals are constantly transmitted from the satellite sensors to the main controller, the overall communication control device consumes considerable power, and noise is constantly generated by the transmitted output signals. Accordingly, to reduce power consumption and noise, there is proposed a communication control device for passenger protection device which includes a transmission prohibition unit which, when the detected values and calculated values of the satellite sensors are below a predetermined value with respect to the threshold for determining collision, prohibits transmission of output signals of these detected values and calculated values. According to this communication control device for passenger protection device, when the detection values and calculation values of the satellite sensors are below a predetermined value with respect to the threshold for determining collision, transmission of output signals of these detected values and calculated values is prohibited, thereby enabling power consumption and unwanted noise to be reduced (e.g., see Japanese Patent No. 3206469).

In the communication control device for passenger protection device disclosed in the above Patent Literature, when the output of the detected value or the calculated value from a satellite sensor is zero, the communication control device for passenger protection device cannot determine whether: (a) the output has been determined to be less than a predetermined value with respect to the threshold for determining collision whereby output is prohibited, or (b) there is a malfunction in the satellite sensor itself, making transmission impossible. Therefore, to determine one of these two states, a determination unit and circuits and the like for the determination unit must be separately provided to the communication control device for passenger protection device.

SUMMARY

It is an object of the present invention to provide a communication control device for passenger protection device which can reduce power consumption and unwanted noise, and can determine that a sensor has ceased to function without the provision of a separate determination unit.

In order to achieve the above object, the communication control device for passenger protection device of the present invention includes a satellite sensor unit which is installed at a predetermined position on a vehicle and includes a satellite sensor main body, which detects an impact against the vehicle to provide an impact signal, and a controller, which provides from a measurement signal in response to the impact signal; and an ECU (electronic control device) which is installed at a predetermined position on the vehicle and includes a main controller which determines deployment of a passenger protection device, the ECU being connected to the satellite sensor unit via a communication line. The controller is adapted to compare a comparing signal related to the measurement signal with a reference value range which is set beforehand, and, when the comparing signal is within the reference value range, the controller transmits an output signal from the satellite sensor unit to the ECU at an interval which is longer than a predetermined time interval.

Although impact against the vehicle must be constantly measured so that the passenger protection device can activate reliably when the vehicle collides, heavy impacts against the vehicle are extremely infrequent. Accordingly, the controller fitted to the satellite sensor unit sets a reference value range beforehand, and, when a measurement or a calculated value obtained from a signal which detects an impact is within the reference value range, communications from the satellite sensor unit to the ECU are transmitted at an interval which is longer than the predetermined time interval. This reduces the frequency of communications from the satellite sensor unit to the ECU.

Since measurement of impacts does not stop but is successively measured, this case differs from a state where it becomes impossible to successively measure the impact against the vehicle when the satellite sensor unit stops due to a malfunction or the like.

Furthermore, in the communication control device for passenger protection device according to this invention, when the measurement or the calculated value changes from a state where in which the measurement exceeds the reference value range to a state where in which the measurement is within the reference value range, the controller transmits communications from the satellite sensor unit to the ECU at an interval which is longer than the predetermined time interval.

When the measurement or the calculated value exceeds the reference value range, communications from the satellite sensor unit to the ECU are transmitted at the predetermined time interval. When the measurement or the calculated value changes from a state where it exceeds the reference value range to one where it is within the reference value range, communications from the satellite sensor unit to the ECU are transmitted at an interval which is longer than the predetermined time interval after it is confirmed that the reference value range is not exceeded after a predetermined time has elapsed. Since the frequency of communications from the satellite sensor unit to the ECU does not decrease until the predetermined time elapses, even if the measurement which is momentarily within the reference value range once again exceeds the reference value range during the predetermined time, the frequency of the communications from the satellite sensor unit to the ECU remains stable.

In the communication control device for passenger protection device according to this invention, when the controller detects a malfunction in the satellite sensor unit, the controller transmits a communication from the satellite sensor unit to the ECU at the predetermined time interval.

When the measurement or the calculated value is within the reference value range, communications from the satellite sensor unit to the ECU are transmitted at an interval which is longer than the predetermined time interval. Here, when a malfunction is detected in the satellite sensor unit, communications are transmitted from the satellite sensor unit to the ECU at the predetermined time interval. Consequently, an irregular state is reached wherein the communication is transmitted at the predetermined time interval in spite of that fact that the measurement is within the reference value range, making it possible to determine that the satellite sensor unit has malfunctioned.

According to the communication control device for passenger protection device of this invention, the frequency of communications from the satellite sensor unit to the ECU is reduced by transmitting the communications at an interval which is longer than a predetermined time interval. This makes it possible to reduce power consumption and unwanted noise.

Since the state of successively measuring an impact against the vehicle differs from a state where measuring of the impact stops due to a malfunction or the like of the satellite sensor unit, it is possible to determine whether the stoppage is due to a malfunction or the like of the satellite sensor unit without the provision of a separate determination unit.

According to the communication control device for passenger protection device of this invention, even if a measurement which is momentarily within the reference value range once again exceeds the reference value range during the predetermined time, the frequency of communications from the satellite sensor unit to the ECU remains stable. Therefore, the passenger protection device can be reliably controlled during the predetermined time.

According to the communication control device for passenger protection device of this invention, when a malfunction of the satellite sensor unit is detected, the malfunction of the satellite sensor unit can be determined by transmitting communications from the satellite sensor unit to the ECU at the predetermined time interval. This makes it possible to determine whether the satellite sensor unit has malfunctioned without providing a separate determination unit.

DETAILED DESCRIPTION

In the following, an embodiment of the present invention will be explained with reference to the drawings.

Figure 1:
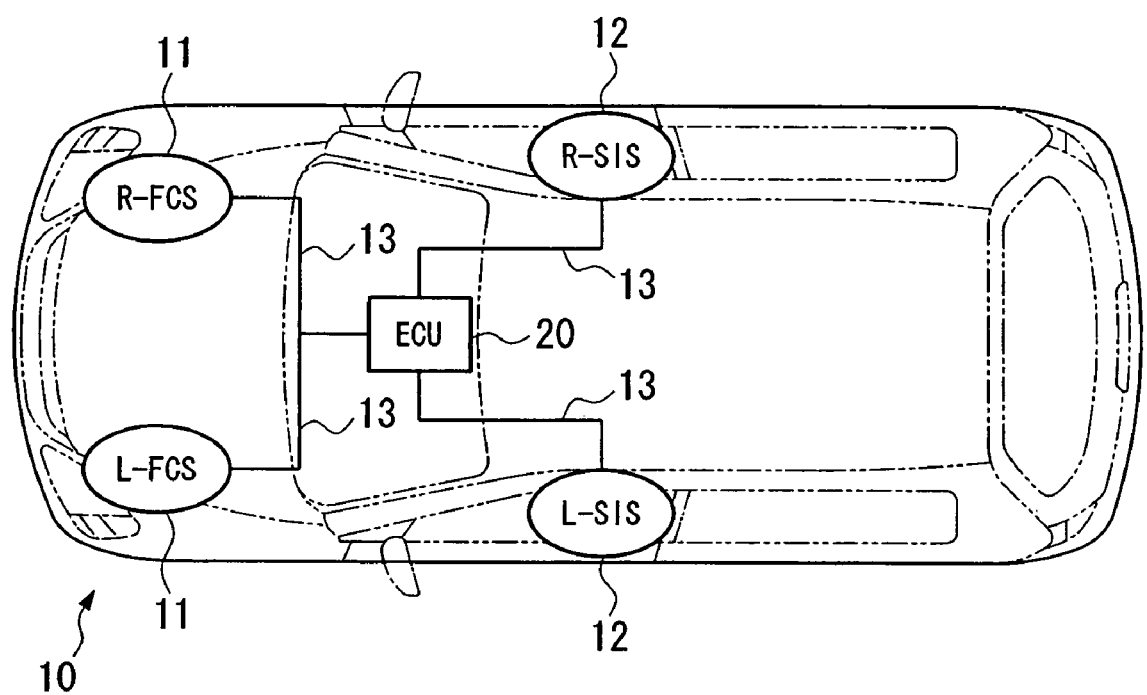
FIG. 1 is a schematic layout of a communication control device for passenger device of the present invention.

FIG. 1 is a schematic layout of a communication control device for passenger device which is an embodiment of the present invention. The communication control device for passenger protection device is mounted on a vehicle 1, and includes a satellite sensor unit 10 and an ECU 20. The satellite sensor unit 10 consists of front crash sensors (L-FCS and R-FCS) 11 and side impact sensors (L-SIS and R-SIS) 12.

The front crash sensors 11 are installed at predetermined positions on the vehicle 1, namely at both sides of the frontmost section of the vehicle 1. The side impact sensors 12 are installed at predetermined positions on the vehicle 1, namely on the left and right sides of the vehicle 1.

The ECU 20 is installed at a different position to the satellite sensor unit 10, namely at the center of the vehicle 1. The ECU 20 is connected to the front crash sensors 11 and the side impact sensors 12 via communication lines 13.

Figure 2:
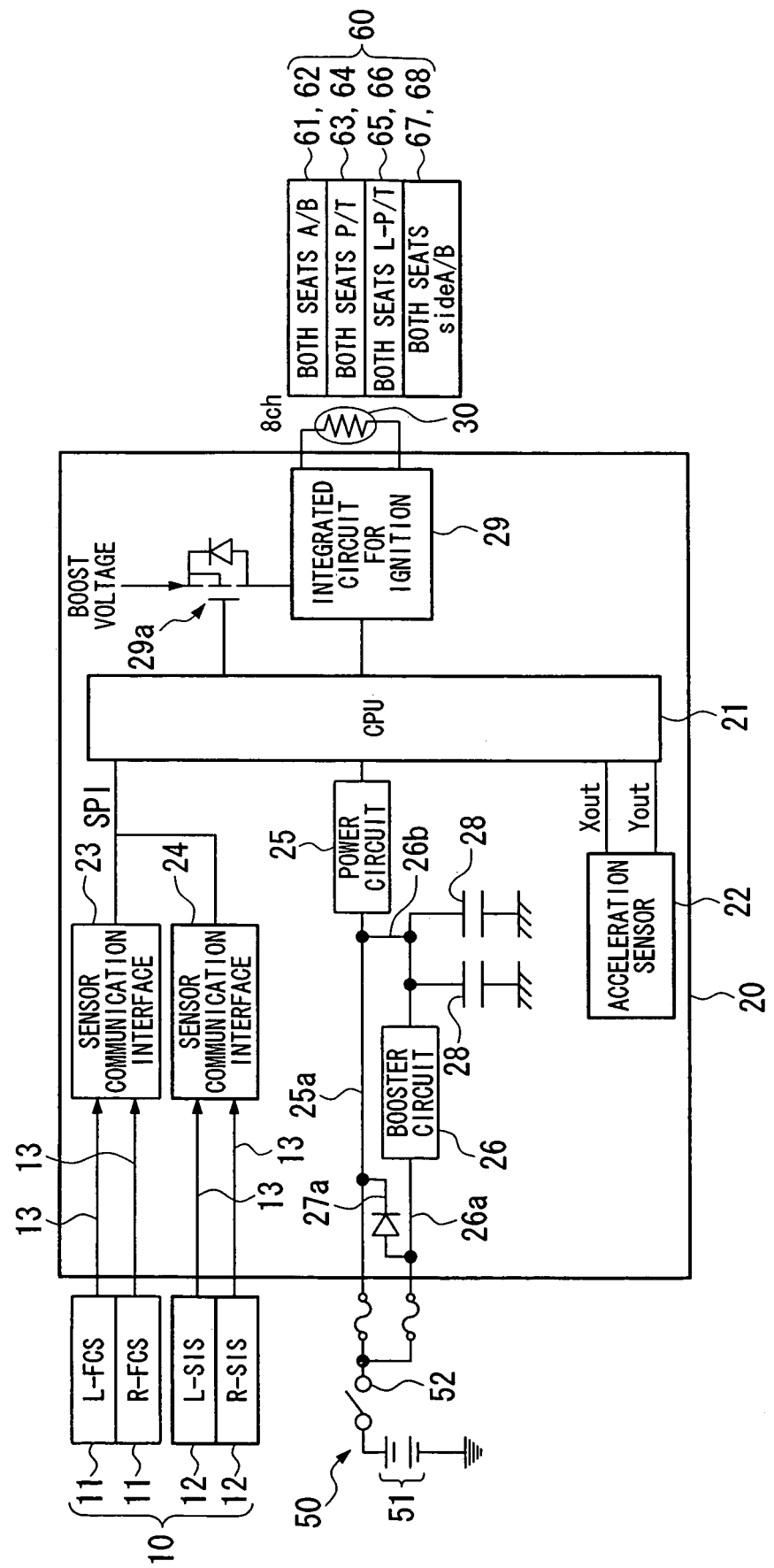
FIG. 2 is a block diagram of the communication control device for passenger protection device.

FIG. 2 is a block diagram of the communication control device for passenger protection device.

The ECU 20 contains a main controller which includes a CPU 21 and an acceleration sensor 22. The CPU 21 determines deployment of a passenger protection device 60 which is mounted on the vehicle 1, based on measurements transmitted from the satellite sensor unit 10. The acceleration sensor 22 detects decelerations caused by impacts against the vehicle 1 in its front-rear direction and its left-right direction, and transmits measurements of these decelerations as output signals to the CPU 21. The acceleration sensor 22 may be installed outside the ECU 20 and connected to the CPU 21.

The ECU 20 includes sensor communication interfaces 23 and 24 which are connected via serial communication to the CPU 21. The sensor communication interfaces 23 and 24 are connected to the front crash sensors 11 and the side impact sensors 12 via the communication lines 13.

The ECU 20 also includes a power circuit 25 which is connected to the CPU 21 and a booster circuit 26 which is connected to the power circuit 25. The power circuit 25 and the booster circuit 26 are each connected to a special-purpose power for passenger protection device 50 which has a battery 51 and a switch 52.

A connection circuit 27a is connected between a connection circuit 25a, which connects the power circuit 25 and the special-purpose power for passenger protection device 50, and a connection circuit 26a, which connects the booster circuit 26 and the special-purpose power for passenger protection device 50, so that the current flows in one direction from the connection circuit 26a to the connection circuit 25a.

Two capacitors 28 are connected to a connection circuit 26b which connects the power circuit 25 and the booster circuit 26. The capacitors 28 are stored so that they can function as batteries for backup when the special-purpose power for passenger protection device 50 ceases to function due to the vehicle 1 being impacted by a collision or the like.

The ECU 20 also includes an integrated circuit for ignition (ignition IC) 29 which is connected to the CPU 21. The passenger protection device 60 is activated by a squib 30, which is connected to the integrated circuit for ignition 29. For the driver's seat and the front passenger's seat, the passenger protection device 60 provides airbags (both seats A/B) 61 and 62, upper pre-tensioners for seatbelt (both seats P/T)

63 and 64, lower pre-tensioners for seatbelt (both seats L-P/T) 65 and 66, and side airbags (both seats side A/B) 67 and 68. The integrated circuit for ignition 29 has eight channels for activating the above parts.

An FET (field effect transistor) 29a uses the CPU 21 to control the voltage boosted by the booster circuit 26, and is connected to the integrated circuit for ignition 29.

A plurality of integrated circuits for ignition 29 may be connected to the CPU 21 in order to increase the number of channels.

Figure 3:
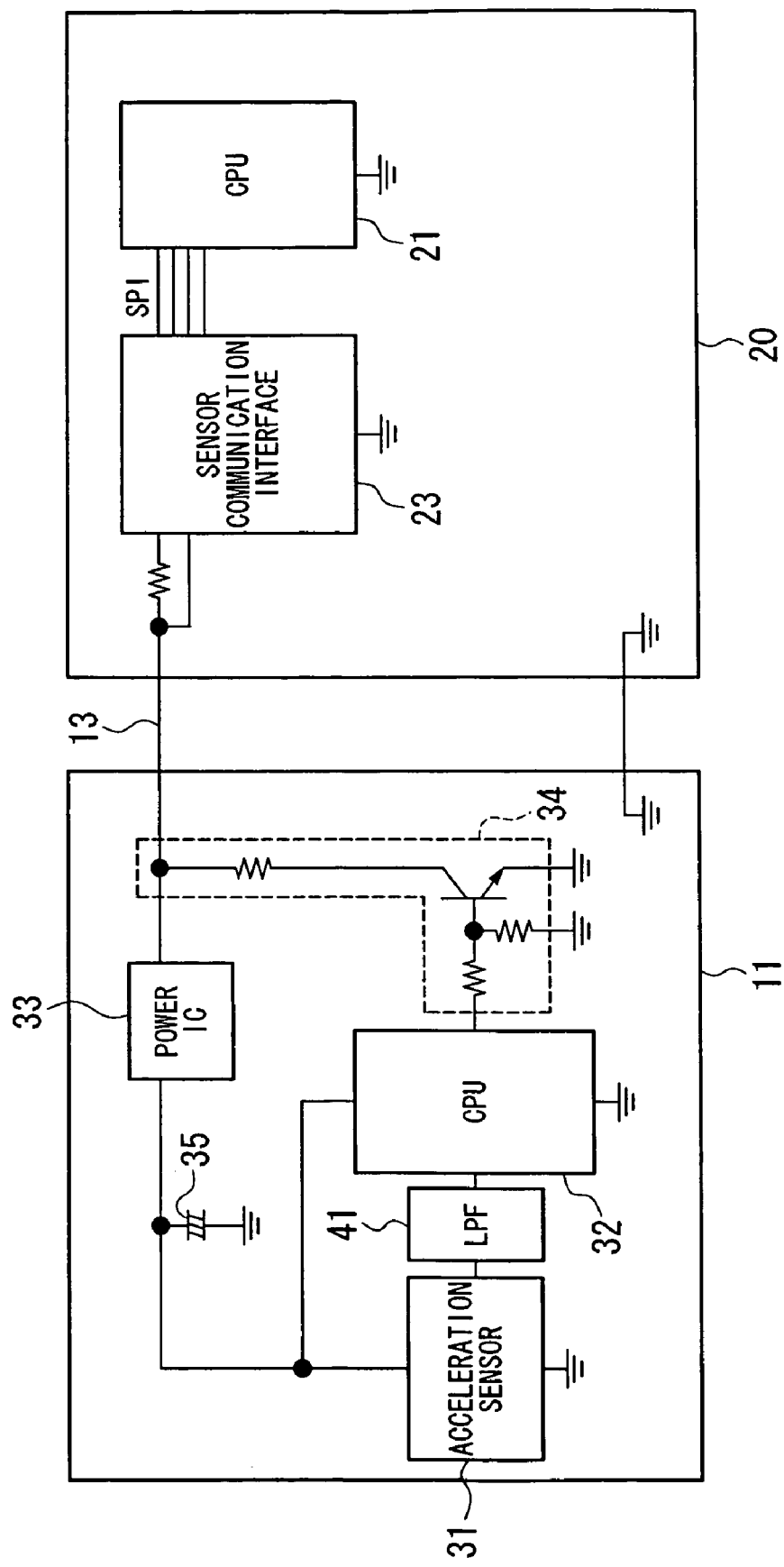
FIG. 3 is a block diagram of a satellite sensor.

The configuration of the circuit which connects the satellite sensor unit 10 to the ECU 20 will be explained with reference to the block diagram of FIG. 3. While the front crash sensor 11 which is connected to the sensor communication interface 23 will be described as an example of the satellite sensor unit 10, the side impact sensor 12 which is connected to the sensor communication interface 24 has the same configuration, and repetitious explanation thereof will be omitted.

The front crash sensor 11 includes an acceleration sensor 31 as a satellite sensor main body which detects deceleration caused by an impact on the vehicle 1, a CPU 32 as a controller which obtains measurements based on a signal detected by the acceleration sensor 31, a power IC 33 for activating the acceleration sensor 31 and the CPU 32, and a communication circuit 34 for transmitting an output signal from the CPU 32 to the sensor communication interface 23. The CPU 32 includes an unillustrated timer. A capacitor 35 is provided between the acceleration sensor 31 and the CPU 32, and the power IC 33. A low pass filter 41 for rejecting redundant signals is provided between the acceleration sensor 31 and the CPU 32.

There are two transmission modes for transmitting output signals from the CPU 32 to the sensor communication interface 23: a continuous transmission mode in which the output signals are transmitted approximately continuously at a predetermined time interval of, for example, 240 μs, and an intermittent transmission mode in which the output signals are transmitted at an interval which is longer than the predetermined time interval, e.g., 80 ms.

In the communication control device for passenger protection device described above, the front crash sensors 11 and the side impact sensors 12 provided in the satellite sensor unit 10 measure impacts against the vehicle 1 at an interval of, for example, 240 μs. When the measurement or a calculated value which is calculated based on the measurement is less than a predetermined reference value range (e.g., ±2 G, 1 G=9.8 m/s$^2$), the measurement/calculated value is transmitted to the sensor communication interfaces 23 and 24 in an output signal in the intermittent transmission mode every 80 ms. When the measurement/calculated value exceeds the reference value range of ±2 G, the measurement/calculated value is transmitted to the sensor communication interfaces 23 and 24 in an output signal in the continuous transmission mode every 240 μs. When the measurements/calculated values switch from a state where they exceed the reference value range of ±2 G to one where they are within the reference value range of ±2 G, the timer is activated and, after a predetermined amount of time (e.g., 50 ms) elapses, the output signal of the measurement and calculated values is once again transmitted to the sensor communication interfaces 23 and 24 in the intermittent transmission mode every 80 ms.

Figure 4:
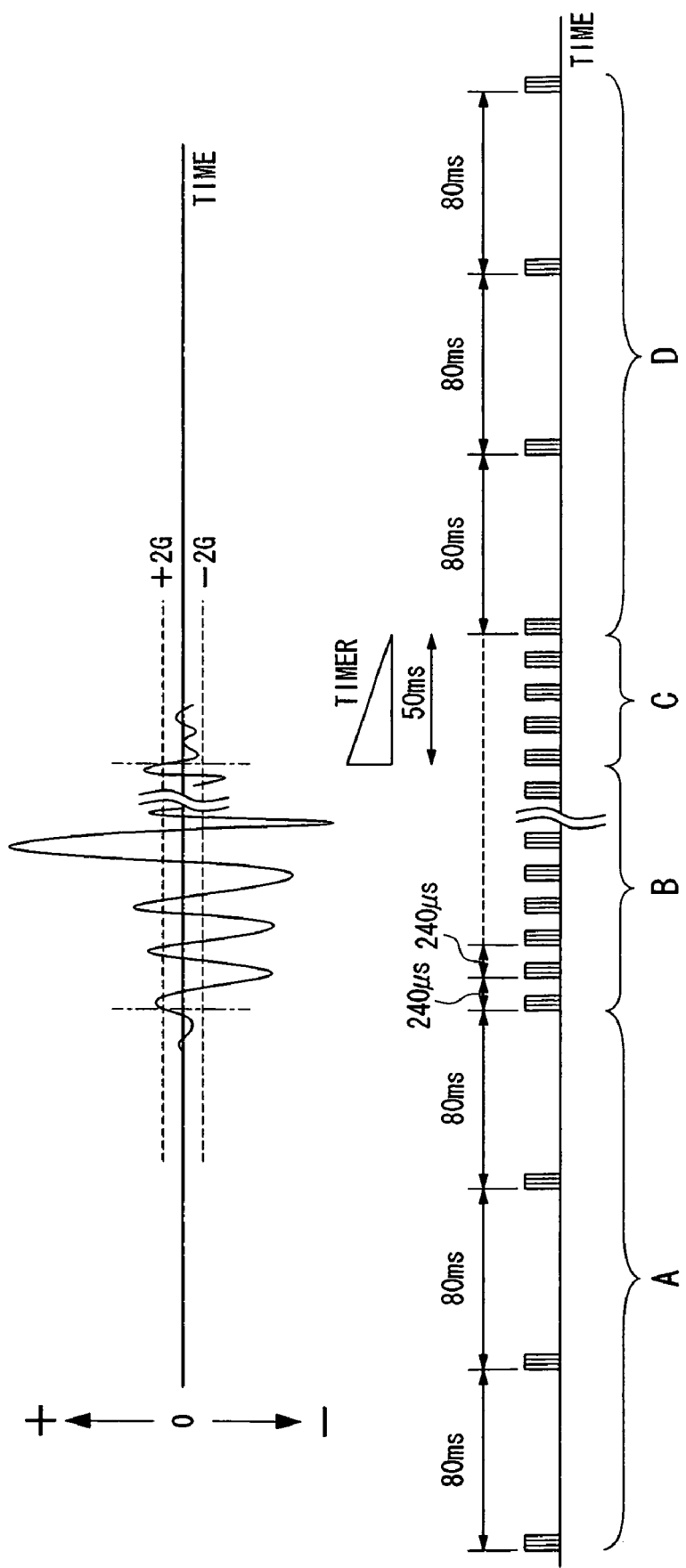
FIG. 4 is a timing chart when the communication control device for passenger protection device is activated.
Figure 5:
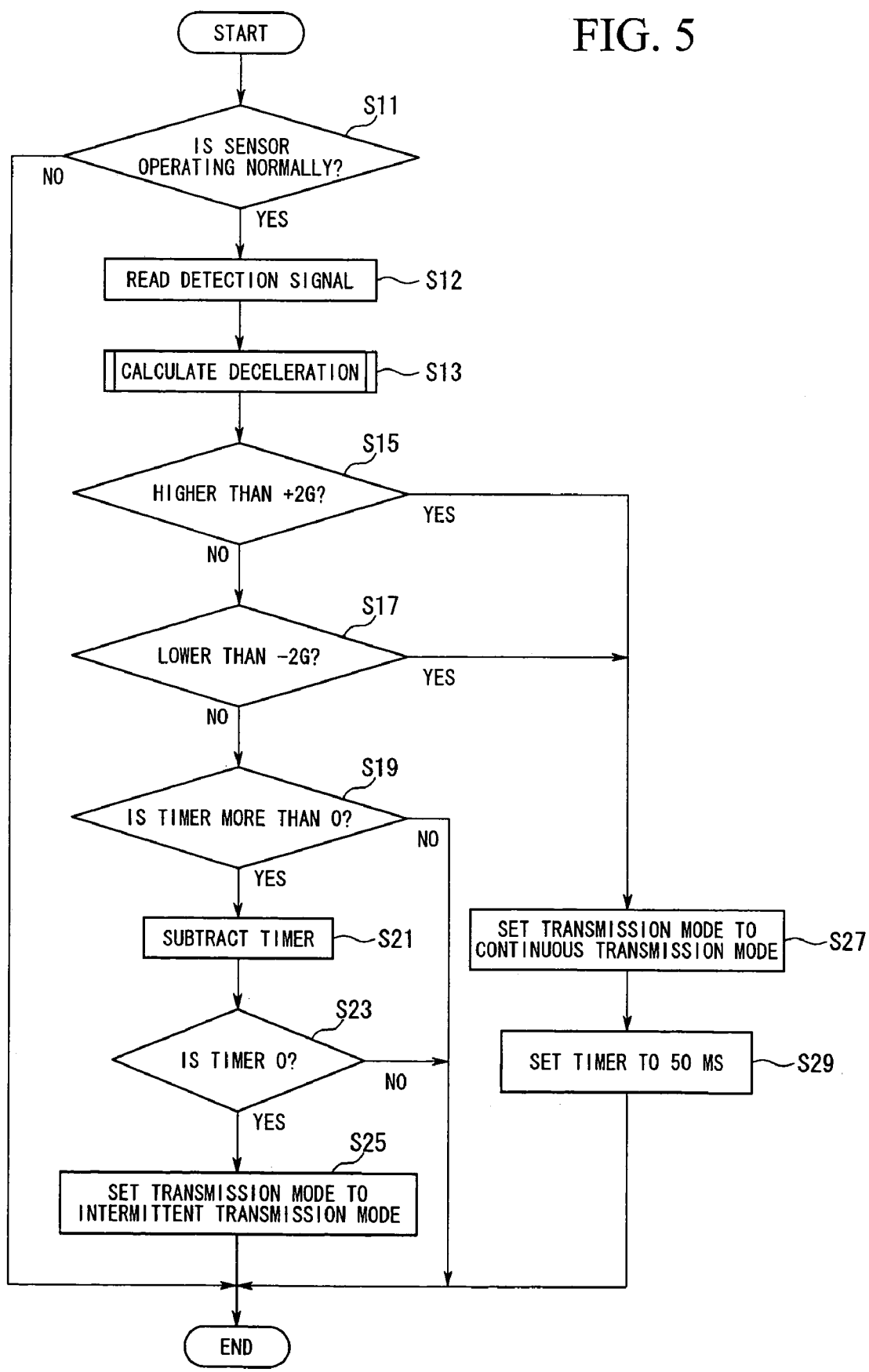
FIG. 5 is a flowchart when the communication control device for passenger protection device is activated.

These functions and operations of the communication control device for passenger protection device will be explained more concretely with reference to FIGS. 4 and 5. FIGS. 4 and 5 illustrate one of the front crash sensors 11, by taking either the front crash sensor 11 or the side impact sensor 12 as an example. Since the functions and operations of the other front crash sensors 11 and the side impact sensors 12 are the same, repetitious explanation of them is omitted.

FIG. 4 is a timing chart of changes in measurements of deceleration detected by the front crash sensor 11, and the transmission interval of a signal which is output from the front crash sensor 11 in correlation with those measurements. FIG. 5 is a flowchart of a step for controlling the transmission interval of the signal output from the front crash sensor 11 in correspondence with change in the measurements of deceleration detected by the front crash sensor 11.

Firstly, as a front stage for detecting deceleration of the vehicle 1, a timer is initialized in the CPU 32 fitted to the front crash sensor 11, and the transmission mode for transmitting to the sensor communication interface 23 in the CPU 21 is set to the intermittent transmission mode. The reference value range which serves as a measurement threshold is set beforehand to ±2 G.

Then, as shown in the flowchart of FIG. 5, it is determined whether the acceleration sensor 31 is operating normally without malfunction (step S11). As long as a signal is being transmitted from the front crash sensor 11 to the sensor communication interface 23, it is determined that the acceleration sensor 31 is operating normally.

When the acceleration sensor 31 is operating normally ('Yes' in step S11), the signal detected by the acceleration sensor 31 is read by its voltage (step S12) and the deceleration is measured from the voltage to obtain a measurement. When the measurement requires correction, a calculated value may be calculated based on the measurement and used as a measurement (step S13).

It is then determined whether this measurement exceeds the reference value range of ±2 G. That is, it is determined whether the maximum measurement value is higher than the upper limit +2 G of the reference value range (step S15), and whether the minimum measurement value is lower than the lower limit −2 G of the reference value range (step S17).

When the maximum measurement value is not higher than the upper limit +2 G of the reference value range ('No' in step S15) and the minimum measurement value is not lower than the lower limit −2 G of the reference value range ('No' in step S17), i.e., when the measurement is within the reference value range of ±2 G, it is determined whether the timer in the CPU 32 is greater than zero (step S19). If the timer is greater than zero ('Yes' in step S19), the timer is subtracted from the value (step S21) and it is determined whether the timer has reached zero (step S23). If the timer is at zero ('Yes' in step S23), the transmission mode is set to the intermittent transmission mode (step S25). When the timer does not exceed zero in step S19 ('No' in step S19), or when the timer is not zero in step S23 ('No' in step S23), the step ends.

When the maximum measurement value is higher than the upper limit +2 G of the reference value range ('Yes' in step S15), or when the minimum measurement value is lower than the lower limit −2 G of the reference value range ('Yes' in step S17), i.e., when the measurement exceeds the reference value range of ±2 G, the transmission mode is switched to the continuous transmission mode (step S27). In addition, the timer is set to 50 ms and started (step S29), whereby the step ends.

When it is determined in step S11 that the acceleration sensor 31 is not operating normally ('No' in step S11), the step ends without executing the above steps.

The steps described above are repeatedly executed every time the transmission mode is set.

As shown in the timing chart of FIG. 4, in step A, when the deceleration measurement detected by the front crash sensor 11 is within the reference value range of ±2 G, the output signal of the deceleration measurement is transmitted from the front crash sensor 11 to the ECU 20 in the intermittent transmission mode.

In step B, when the deceleration measurement detected by the front crash sensor 11 exceeds the reference value range of ±2 G, the transmission mode is switched from the intermittent transmission mode to the continuous transmission mode, and the output signal of the deceleration measurement is transmitted from the front crash sensor 11 to the ECU 20 in the continuous transmission mode.

In step C, when the deceleration measurement detected by the front crash sensor 11 changes from a state where it exceeds the reference value range of ±2 G to one where it is within the reference value range of ±2 G, the transmission mode remains in the continuous transmission mode, and the output signal of the deceleration measurement is transmitted from the front crash sensor 11 to the ECU 20 in the continuous transmission mode for a time of 50 ms set by the timer.

In step D, when the deceleration measurement detected by the front crash sensor 11 is within the reference value range of ±2 G and 50 ms have elapsed, the transmission mode is switched from the continuous transmission mode to the intermittent transmission mode, and the output signal of the deceleration measurement is transmitted from the front crash sensor 11 to the ECU 20 in the intermittent transmission mode.

According to the operation of the communication control device for passenger protection device described above, in the step B of FIG. 4, i.e., step S27 of FIG. 5, the transmission mode remains in the continuous transmission mode and the output signal of the deceleration measurement is transmitted from the front crash sensor 11 to the ECU 20. At this time, the CPU 21 determines whether to activate the passenger protection device 60 based on the measurement.

In other words, when the measurement exceeds the threshold for activating the passenger protection device 60 which is set beforehand, the CPU 21 determines that the passenger protection device 60 should be activated. Then, the CPU 21 uses the FET 29a to ignite the squib 30 which is attached to the integrated circuit for ignition 29, and activates the passenger protection device 60.

In this communication control device for passenger protection device, although impact against the vehicle 1 must be constantly measured so that the passenger protection device 60 can be reliably activated when the vehicle 1 collides, heavy impacts against the vehicle 1 are extremely infrequent. Accordingly, the CPU 32 fitted to the front crash sensor 11 sets a reference value range beforehand, and, when a measurement or a calculated value obtained from a signal which detects an impact is within the reference value range of ±2 G, communications from the front crash sensor 11 to the ECU 20 are transmitted at an interval which is longer than the predetermined time interval of 240 μs, i.e., at an interval of 80 ms. This reduces the frequency of communications from the front crash sensor 11 to the ECU 20. Therefore, by transmitting communications from the front crash sensor 11 to the ECU 20 at an interval of 80 ms, power consumption and unwanted noise can be reduced.

Furthermore, in this communication control device for passenger protection device, even if an impact against the vehicle 1 is zero or extremely small, measurement of the impact does not stop but is successively measured every 80 ms in the intermittent transmission mode. Consequently, this state of successively measuring the impact against the vehicle 1 differs from a state where the impact against the vehicle 1 cannot be successively measured due to a malfunction or the like of the satellite sensor unit 10. It is therefore possible to determine whether measurement has stopped due to a malfunction or the like of the satellite sensor unit 10 based on the operating status of the satellite sensor unit 10, without providing a separate determination unit.

Furthermore, in this communication control device for passenger protection device, when the measurement of an impact against the vehicle 1 exceeds the reference value range of ±2 G, communications from the front crash sensor 11 to the ECU 20 are transmitted at the predetermined time interval, i.e., 240 μs. When the measurement changes from a state where it exceeds the reference value range of ±2 G to one where it is within the reference value range of ±2 G, if the measurement does not exceed the reference value range of ±2 G for a time of 50 ms set by the timer, communications from the front crash sensor 11 to the ECU 20 are transmitted every 80 ms. Since the frequency of communications from the front crash sensor 11 to the ECU 20 does not decrease until 50 ms have elapsed on the timer, the measurement does not momentarily exceed the reference value range of ±2 G and, even if the measurement which is within the reference value range of ±2 G exceeds the reference value range of ±2 G once again after 50 ms, the frequency of the communications from the front crash sensor 11 to the ECU 20 is stable. Therefore, the activation of the passenger protection device 60 can be reliably controlled until 50 ms have elapsed.

In the embodiment described above, the CPU 32 may function so that it can detect a malfunction in the satellite sensor unit 10.

Figure 6:
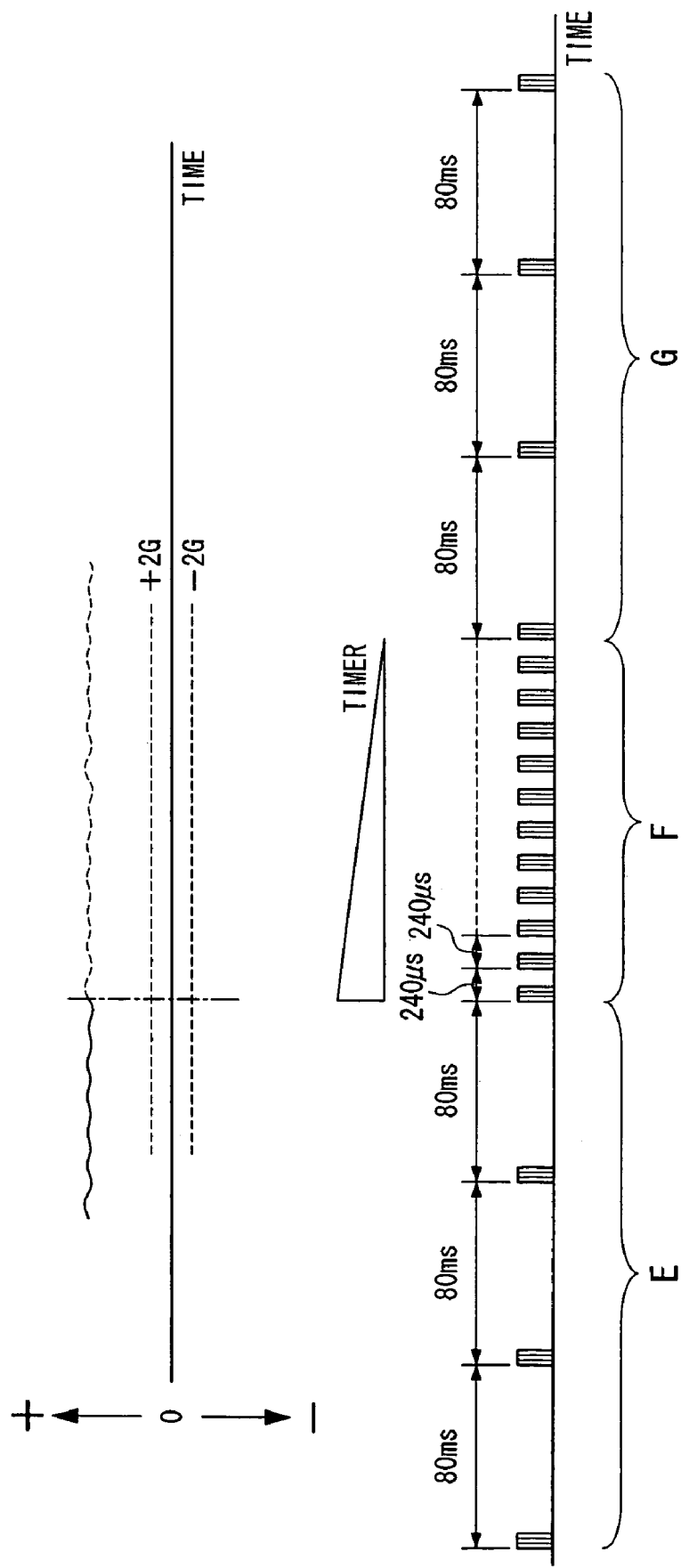
FIG. 6 is a timing chart when a malfunction is detected in the communication control device for passenger protection device.
Figure 7:
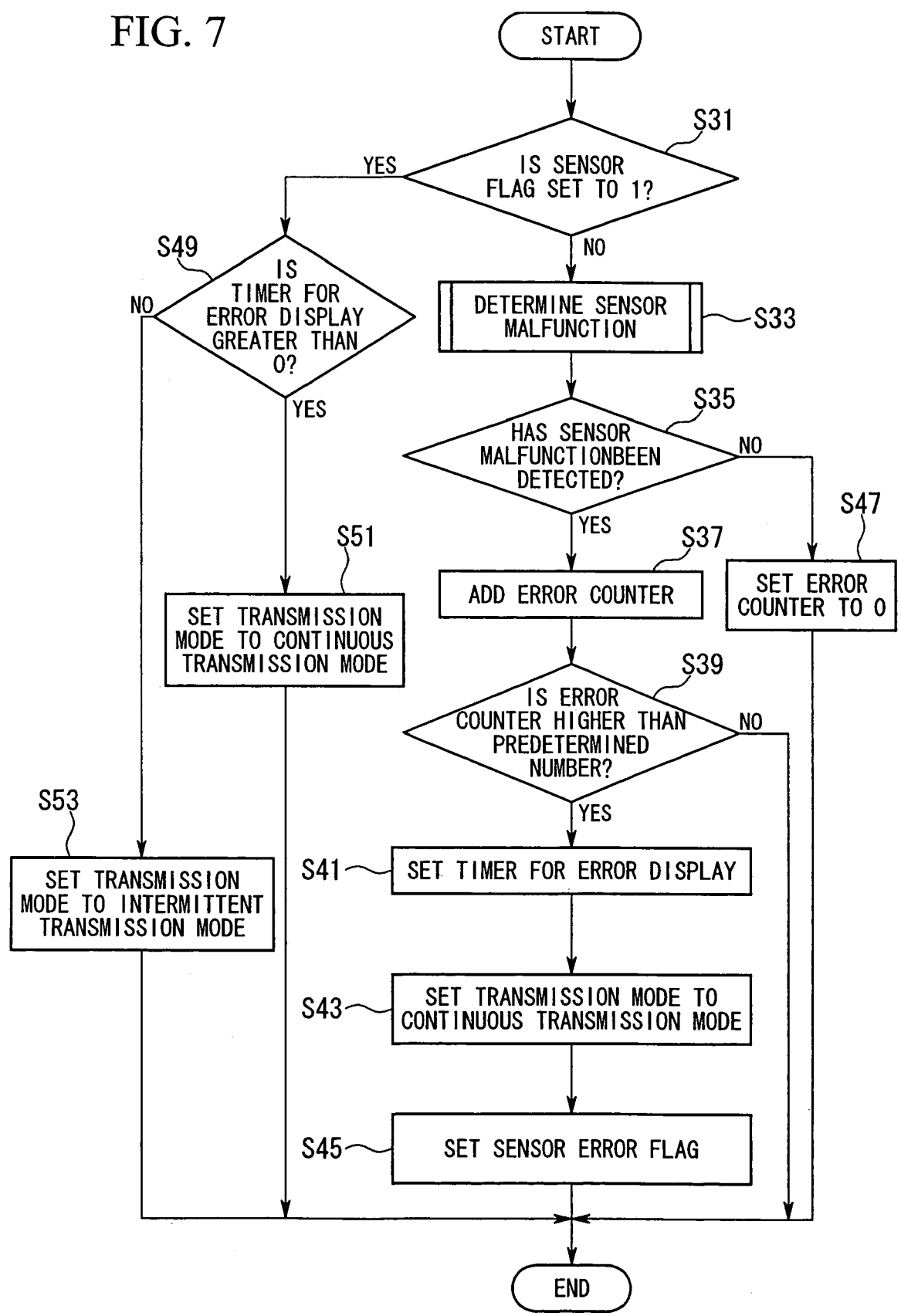
FIG. 7 is a flowchart when a malfunction is detected in the communication control device for passenger protection device.

Here, the functions and operations when the satellite sensor unit 10 has malfunctioned will be explained more concretely with reference to FIGS. 6 and 7. FIGS. 6 and 7 illustrate the front crash sensor 11, taking either the front crash sensor 11 or the side impact sensor 12 as an example. Since the other front crash sensors 11 and the side impact sensors 12 have the same functions and operations, repetitious explanation thereof will be omitted.

FIG. 6 is a timing chart of changes in measurements of deceleration detected when the front crash sensor 11 has malfunctioned, and the transmission interval of a signal which is output from the front crash sensor 11 in correlation with those measurements. FIG. 7 is a flowchart of a step when the front crash sensor 11 has malfunctioned.

Firstly, as a front stage for detecting malfunction of the front crash sensor 11, in the CPU 32 provided in the front crash sensor 11, an unillustrated timer for error display and an error counter which are provided in the CPU 32 are initialized, and the transmission mode for transmitting to the sensor communication interface 23 in the ECU 20 is set to the intermittent transmission mode. In the processing executed by the CPU 32, a sensor flag which is set when a sensor error is detected is turned to an unset state. Here, a 'sensor error' is a detected malfunction of the front crash sensor 11, e.g., a malfunction of the acceleration sensor 31 or the CPU 32. At such a time, the sensor flag is set.

As shown in the flowchart of FIG. 7, it is then determined whether a sensor error has been detected, i.e., whether the sensor flag is set (step S31). When a sensor error is detected ('No' in step S31), the CPU 32 carries out a check to determine a malfunction of the front crash sensor 11 (step S33).

Here, the CPU 32 determines whether a malfunction has been detected in the front crash sensor 11 (step S35), and if so ('Yes' in step S35), adds '1' to the error counter (step S37). It then determines whether the error counter has counted more than a predetermined number of times, e.g., ten times (step S39). If the error counter is greater than ten times ('Yes' in step S39), this indicates that a malfunction of the front crash sensor 11 has been detected more than ten times, and it is therefore determined that a malfunction of the front crash sensor 11 has been reliably detected. The CPU 32 sets the timer for error display to a predetermined time (step S41), sets the transmission mode to the continuous transmission mode in order to indicate that the malfunction of the front crash sensor 11 has been reliably detected (step S43), and sets the sensor flag (step S45), at which point the step ends.

If the error counter has counted fewer than ten times in step S39 ('No' in step S39), the step ends at that point.

In step S35, when no malfunction is detected in the front crash sensor 11 ('No' in step S35), the error counter is reset (step S47) and the step ends.

In step S31, when a sensor error is detected, i.e., when the sensor flag is not set ('Yes' in step S31), it is determined whether the timer for error display is greater than zero (step S49). Here, when the timer for error display is greater than zero ('Yes' in step S49), the transmission mode is set to the continuous transmission mode (step S51), and the step ends. When the timer for error display is not greater than zero ('No' in step S49), the transmission mode is set to the intermittent transmission mode (step S53), and the step ends.

The above steps are repeatedly executed each time the transmission mode is set.

As shown in the timing chart of FIG. 6, in step E, when no malfunction is detected in the front crash sensor 11, or when a malfunction is detected in the front crash sensor 11 but cannot be confirmed to be a malfunction, the transmission mode is kept in the intermittent mode and a detection signal relating to the malfunction in the front crash sensor 11 is transmitted from the front crash sensor 11 to the ECU 20.

In step F, when a malfunction is detected in the front crash sensor 11 and is confirmed to be a malfunction, the transmission mode is switched from the intermittent transmission mode to the continuous transmission mode and a detection signal indicating the malfunction in the front crash sensor 11 is transmitted from the front crash sensor 11 to the ECU 20 until the timer for error display reaches zero.

In step G, when the timer for error display reaches zero, the transmission mode is switched from the continuous transmission mode to the intermittent transmission mode and a detection signal indicating the malfunction in the front crash sensor 11 is transmitted from the front crash sensor 11 to the ECU 20.

In this communication control device for passenger protection device, when the measurement is within the reference value range of ±2 G, a communication is transmitted from the front crash sensor 11 to the ECU 20 at an interval longer than the predetermined time interval, i.e., every 80 ms. When a malfunction is detected in the front crash sensor 11, a communication is transmitted from the front crash sensor 11 to the ECU 20 at the predetermined time interval, i.e., 240 μs. Consequently, an irregular state is reached wherein, in spite of the fact that the measurement is within the reference value range of ±2 G so that communication should normally be transmitted every 80 ms, the communication is actually transmitted every 240 μs. Thus the malfunction of the front crash sensor 11 can be determined. Therefore, it is possible to determine whether the front crash sensor 11 has malfunctioned without providing a separate determination unit.

In the embodiment described above, the reference value range which is compared with a measurement obtained by measuring an impact against the vehicle 1 is not limited to ±2 G. It is also acceptable to set separate reference value ranges for each of the front crash sensors 11 and the side impact sensors 12.

In the embodiment described above, the timer need not be fitted to the CPU 32. In this case, when the measurement changes from a state where it exceeds the reference value range of ±2 G to one where it is within the reference value range of ±2 G, a communication is transmitted from the front crash sensor 11 to the ECU 20 at an interval which is longer than a predetermined time interval, i.e., every 80 ms, without a predetermined time having elapsed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A communication control device for passenger protection device, comprising:
    a satellite sensor unit which is installed at a predetermined position on a vehicle and comprises a satellite sensor main body, which detects an impact against the vehicle to provide an impact signal, and a controller, which provides a measured impact data signal in response to the impact signal; and
    an ECU which is installed at a predetermined position on the vehicle and comprises a main controller which determines deployment of a passenger protection device, the ECU being connected to the satellite sensor unit via a communication line, wherein
    the controller is constructed and arranged to compare a comparing impact value related to the measured impact data signal with a preset reference impact value range, when the comparing impact value is in excess of the preset reference impact value range, the controller transmits an output signal from the satellite sensor unit to the ECU at a first time interval, and, when the comparing impact value is within the reference impact value range, the controller transmits the output signal at a second time interval which is longer than the first time interval.

2. The communication control device for passenger protection device according to claim 1, further comprising:
    a timer that clocks a predetermined period, wherein
    when the comparing impact value signal changes from a state in which the comparing impact value signal exceeds the reference impact value range to a state in which the comparing impact value is within the reference impact value range, the controller transmits the output signal at the second time interval after the predetermined period has been clocked by the timer.

3. The communication control device for passenger protection device according to claim 1, wherein, when the controller detects a malfunction in the satellite sensor unit, the controller transmits the output signal at the first time interval.

4. The communication control device for passenger protection device according to claim 2, wherein, when the controller detects a malfunction in the satellite sensor unit, the controller transmits the output signal at the first time interval.

5. The communication control device for passenger protection device according to claim 1, further comprising:
    a timer that clocks a waiting time for changing the time interval of the transmitted output signal, wherein,
    when the comparing impact value signal changes from a state in which the comparing impact value signal exceeds the reference impact value range to a state in which the comparing impact value signal is within the reference impact value range, the controller transmits the output signal at the second time interval after the waiting time has been clocked by the timer.

* * * * *